US012779401B2

(12) United States Patent
Bromley

(10) Patent No.: US 12,779,401 B2
(45) Date of Patent: Nov. 3, 2026

(54) METHODS OF LOW TRANS-MEMBRANE PRESSURE OR VACUUM FILTRATION

(71) Applicant: 643096 Alberta Limited, West Vancouver (CA)

(72) Inventor: David Bromley, West Vancouver (CA)

(73) Assignee: 643096 Alberta Limited, West Vancouver (CA)

( * ) Notice: Subject to any disclaimer, the term of this patent is extended or adjusted under 35 U.S.C. 154(b) by 365 days.

(21) Appl. No.: 18/542,721

(22) Filed: Dec. 17, 2023

(65) Prior Publication Data

US 2024/0116001 A1 Apr. 11, 2024

Related U.S. Application Data

(63) Continuation of application No. PCT/CA2022/051003, filed on Jun. 22, 2022.

(60) Provisional application No. 63/213,653, filed on Jun. 22, 2021.

(51) Int. Cl.
*B01D 61/36* (2006.01)
*B01D 65/02* (2006.01)

(52) U.S. Cl.
CPC ........... *B01D 61/368* (2013.01); *B01D 65/02* (2013.01); *B01D 2311/04* (2013.01); *B01D 2315/06* (2013.01); *B01D 2321/04* (2013.01)

(58) Field of Classification Search
CPC ...... B01D 61/368; B01D 65/02; B01D 65/08; B01D 67/0088; B01D 2315/06; B01D 2321/281
See application file for complete search history.

(56) References Cited

U.S. PATENT DOCUMENTS 3,977,967 A 8/1976 Trulson et al.

FOREIGN PATENT DOCUMENTS

| | | | | |
|---|---|---|---|---|
| JP | 2670277 B2 | | 10/1997 | |
| KR | 101745146 B1 | | 6/2017 | |
| WO | WO-9628236 A1 | * | 9/1996 | .......... B01D 65/109 |

OTHER PUBLICATIONS

Usman et al., "Pre-deposited dynamic membrane adsorber formed of microscale conventional iron oxide-based adsorbents to remove arsenic from water: application study and mathematical modeling". Journal of Chemical Technology and Biotechnology, Mar. 27, 2021 (Mar. 27, 2021), vol. 96(6), pp. 1504-1514.

Bromley et al., "Replaceable Skin Layer Membranes—Manipulating the Electric Double Layer on Collodial Solids to create 10-fold improvement in Flux rates", Jun. 24, 2021.

* cited by examiner

*Primary Examiner* — Bradley R Spies
(74) *Attorney, Agent, or Firm* — Todd A. Rattray; Oyen Wiggs Green & Mutala LLP

(57) ABSTRACT

A membrane filter is treated with formulated oxide powder and submerged in a liquid to be treated. Colloids in the liquid to be treated are separated and removed, and a colloid-free gap is maintained between the filtered colloids and the formulated oxide powder on the surface of the membrane by adjusting the flux rate which may typically range from 250-750 litres per $m^2$ per hour. A low trans-membrane pressure is maintained across the membrane while the colloid-free gap is maintained, and a low turbidity is achieved in the filtered liquid.

20 Claims, 11 Drawing Sheets

PRIOR ART

METHODS OF LOW TRANS-MEMBRANE PRESSURE OR VACUUM FILTRATION

RELATED APPLICATIONS

This application is a continuation of PCT application No. PCT/CA2022/051003 having an international filing date of 22 Jun. 2022, which in turn claims priority from (and, for the purposes of the Unites States, the benefit under 35 USC 119 in relation to) U.S. application No. 63/213,653 filed 22 Jun. 2021. All of the applications in this paragraph are hereby incorporated herein by reference.

TECHNICAL FIELD

This invention relates to the field of liquid filtration, particularly membrane filtration. Particular embodiments of this invention may filter liquid with a low trans-membrane pressure (TMP) across the membrane. Other embodiments may provide for a method of filtering liquid stored in a tank without the need for a pump.

BACKGROUND

There is a general desire to filter liquid with as little energy as possible. It is also desirable to produce filtered liquid with a low turbidity (which is a measure of the cloudiness of a fluid due to the presence of suspended particles).

Conventional methods of membrane filtration can be classified into two broad categories. A first such category is direct membrane filtration, which involves the use of a membrane with a pore size that is smaller than the solids sought be separated from the liquid. Examples of this type of direct membrane filtration include microfiltration and ultrafiltration. A second category of filtration involves the use of a so-called "filter cake" or similar aid on the surface of a porous membrane, such that the actual filtration action is performed by the filter cake as the liquid to be filtered is drawn through the filter cake and the membrane. An example of this second category of filtration is known as dynamic membrane filtration.

Backwashing is a method of operating a direct membrane filter. In the filtration cycle, liquid is drawn through the membrane filter, and colloids that are suspended in the liquid to be treated are deposited on the surface of the membrane filter. As the amount of colloid deposited on the membrane increases, the trans-membrane pressure (TMP) across the filter increases. During the operation of the filter, the flow of liquid is periodically reversed for short bursts in a process known as backwashing. Backwashing results in some of the deposited colloids being dislodged. After backwashing, there is a temporary decrease in TMP, but the continual build up of colloids on the filter results in cyclic buildup of TMP between each backwashing cycle.

FIG. 1 shows a plot of TMP 2 and turbidity of the filtered fluid 4 as a function of filtration time for a typical prior art direct membrane filtration operation. FIG. 1 shows how the TMP 2 exhibits a "saw-tooth" shape, where the TMP increases during each filtration period 2A and decreases during each backwash period 2B. Typically, after a prescribed number of filtration/backwash cycles, a chemically enhanced backwash (CEB) 2C is used to improve the backwash process and reduce the TMP closer to that of the original filter membrane. FIG. 1 shows a number of CEB cycles 2C, and that the membrane is never able to return to its original TMP level. Typically, after a number of backwash and CEB cycles, a further membrane-cleaning operation, known as a clean-in-place (CIP) operation (not shown in FIG. 1) is performed to help clean the membrane and restore the TMP. CIP operations typically involve the use of caustic and acidic cleaning agents, but again, even with the CIP operation, the TMP of the membrane can not be restored to its original level. FIG. 1 also shows how the turbidity (clarity) of the filtered liquid (known as filtrate or permeate) is of consistent quality.

An advantage of the short burst backwash cycles 2B in the direct membrane filtration process shown in FIG. 1 is that no reject stream is created by the filtration system, as the backwash volume is placed back into the stream of fluid to be filtered. In contrast, where CEB 2C and/or CIP operations are performed, a reject stream is created and this reject stream must typically be discarded. A disadvantage of direct membrane filtration and the short burst backwash cycles 2B is that the backwash volume returned to the liquid to be treated results in a decrease in the net flux rate of the treated liquid flowing through the membrane.

Another method of operating a membrane filter is the dynamic filter method. A liquid to be treated is drawn through a membrane. Colloids in the liquid deposit on the surface of the membrane, and accumulate as a porous filter cake. The thickness of the filter cake increases as the filtration time increases. The filtration is performed by the filter cake. In some instances, prior to drawing water to be treated through the membrane, a filter aid, such as diatomaceous earth is added to a clean liquid which is drawn through the membrane to initiate the formation of the filter cake. Then, the liquid to be treated is drawn through the membrane to continue to build the filter cake as filtration is performed.

FIG. 2 shows a plot of TMP 6 and turbidity of the filtered fluid 8 as a function of filtration time for a typical prior art dynamic filter operation. An advantage of the dynamic filter method is that the quality of the treated liquid improves (i.e. the turbidity 8 of the permeate decreases) as the filtration time increases due to the accumulated filter cake on the membrane surface. A disadvantage of the dynamic filter method is that as the filter cake increases in thickness over time, the TMP 6 increases as well. Furthermore, during the initial time period of filtration, when the filter cake has not fully developed, the quality of the filtered liquid is poor (i.e. the permeate exhibits relatively a high turbidity 8). Typically, because of this high initial turbidity, liquid treated by the filter during the initial stages of dynamic membrane filtration must either be rejected (which results in waste), or returned to the filter feed stream (which reduces the net flux rate and increases the energy and time required to filter a given volume of fluid).

There remains a need for a method of filtration that operates with a low TMP, produces no reject stream, and produces a filtered liquid with a consistently low turbidity.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for treating liquid. The method comprises: submerging a membrane treated with formulated oxide powder in a liquid to be treated; maintaining a system pressure differential between locations across the membrane to draw the liquid to be treated through the membrane; filtering the liquid to be treated by maintaining a colloid-free gap between the formulated oxide powder on the membrane and colloids in the liquid to be treated; and adjusting the filtration loading rate of the liquid to be treated to maintain the colloid-free gap.

Another aspect of the invention provides a method of filtering liquid. The method comprises: submerging a membrane treated with formulated oxide powder in a liquid to be treated; drawing the liquid to be treated through the membrane; filtering the liquid to be treated by maintaining a colloid-free gap between the formulated oxide powder on the membrane and colloids in the liquid to be treated; and maintaining a low trans-membrane pressure (TMP) across the membrane (e.g. less than 25 kPa, less than 20 kPa, less than 15 kPa or less than 7 kPa).

Another aspect of the invention provides a method for treating liquid in a tank. The method comprises: fluidly attaching a membrane treated with formulated oxide powder to a tank containing a liquid to be treated; drawing the liquid to be treated through the membrane with a system pressure differential across the membrane, the system pressure differential imposed by the fluid height in the tank; and filtering the liquid in the tank by maintaining a colloid-free gap between the formulated oxide powder on the membrane and the colloids in the liquid to be treated. The method may comprise treating the surface of the membrane by depositing the formulated oxide powder into a treated liquid stored in a separate tank and drawing the treated liquid through the membrane with a system pressure differential imposed by the fluid height of the separate tank and thereby depositing the formulated oxide powder on the surface of the membrane. The fluid height of the tank may provide the only source of pressure differential across the membrane. The method may comprise maintaining the colloid-free gap throughout the time it takes for the liquid to be treated in the tank to drain through the membrane.

The methods may comprise treating the surface of the membrane by depositing the formulated oxide powder into a treated liquid and drawing the treated liquid through the membrane with the system pressure differential between locations across the membrane thereby depositing the formulated oxide powder on the surface of the membrane.

The filtration loading rate may be reduced over a filtration time to maintain the colloid-free gap. The filtration loading rate may be maintained constant.

Maintaining a colloid-free gap may comprise causing a trans-membrane pressure (TMP) of less than 25 KPa or less than 20 KPa.

The methods may comprise detecting a breakdown of the colloid-free gap after a period of sustained filtering. Detecting the breakdown of the colloid-free gap may comprise detecting a change in trans-membrane pressure (TMP) from below a threshold to above the threshold. detecting the change in trans-membrane pressure (TMP) from below the threshold to above the threshold may comprise detecting the change in TMP within a threshold amount of time.

The methods may comprise backwashing the membrane after detecting the breakdown of the colloid-free gap. Air may be used as the backwash fluid. Backwashing the membrane may comprise: allowing a backwash volume to settle in a settling tank, returning a supernatant volume to the liquid to be treated, and a rejecting a settled volume.

The methods may comprise reducing a filtration loading rate after detecting the breakdown of the colloid-free gap. The methods may comprise after reducing the filtration loading rate, determining that the TMP has increased to above a further threshold level and backwashing the membrane after determining that the TMP has increased to above a further threshold level.

Another aspect of the invention provides a method for treating liquid, the method comprising submerging a membrane treated with formulated oxide powder in a liquid to be treated, maintaining a pressure differential across the membrane (e.g. a low TMP) to draw the liquid to be treated through the membrane, filtering the liquid to be treated by maintaining a colloid-free gap between the formulated oxide powder on the membrane and the colloids in the liquid to be treated, and adjusting the filtration loading rate of the liquid to be treated to maintain the colloid-free gap. The formulated oxide powder may be deposited on the surface of the membrane by depositing the formulated oxide powder into a treated liquid and drawing the treated liquid through the membrane with a pressure differential, thereby depositing the formulated oxide powder on the surface of the membrane. The filtration loading rate may be varied as the filtration time increases to maintain the colloid-free gap, or the filtration rate may be kept constant. The colloid-free gap may breakdown after sustained loading of the filter, which will result in a TMP across the membrane that increases with filtration time. The membrane filter may then be backwashed, preferably with air. The backwash volume may settle in a tank, with the supernatant volume being returned to the liquid to be treated and the settled volume being rejected.

Another aspect of the invention provides a method for treating a liquid, the method comprising submerging a membrane treated with formulated oxide powder in a liquid to be treated, drawing the liquid to be treated through the membrane, filtering the liquid to be treated by maintaining a colloid-free gap between the formulated oxide powder on the membrane and the colloids in the liquid to be treated, and maintaining a low TMP across the membrane. The TMP may monitored, and may be kept in the range of 0 to 14 kPa. Upon the TMP reaching a prescribed level, the filtration may be stopped and the filter may be backwashed.

Another aspect of the invention provides a method for treating liquid in a tank, the method comprising fluidly attaching a membrane filter treated with formulated oxide powder to a tank containing a liquid to be treated, drawing the liquid to be treated through the membrane with a pressure differential across the membrane imposed by the tank head, and filtering the liquid in the tank by maintaining a colloid-free gap between the formulated oxide powder on the membrane and the colloids in the liquid to be treated. The membrane filter may be treated with formulated oxide powder by depositing the formulated oxide powder into a treated liquid stored in a separate tank and drawing the treated liquid through the membrane with a pressure differential imposed by the head of the separate tank thereby depositing the formulated oxide powder on the surface of the membrane. The tank head may be the only source of pressure differential across the membrane. The colloid-free gap may be maintained throughout the time it takes for the liquid to be treated to drain through the membrane.

It is emphasized that the invention relates to all combinations of the above features, even if these are recited in different claims.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
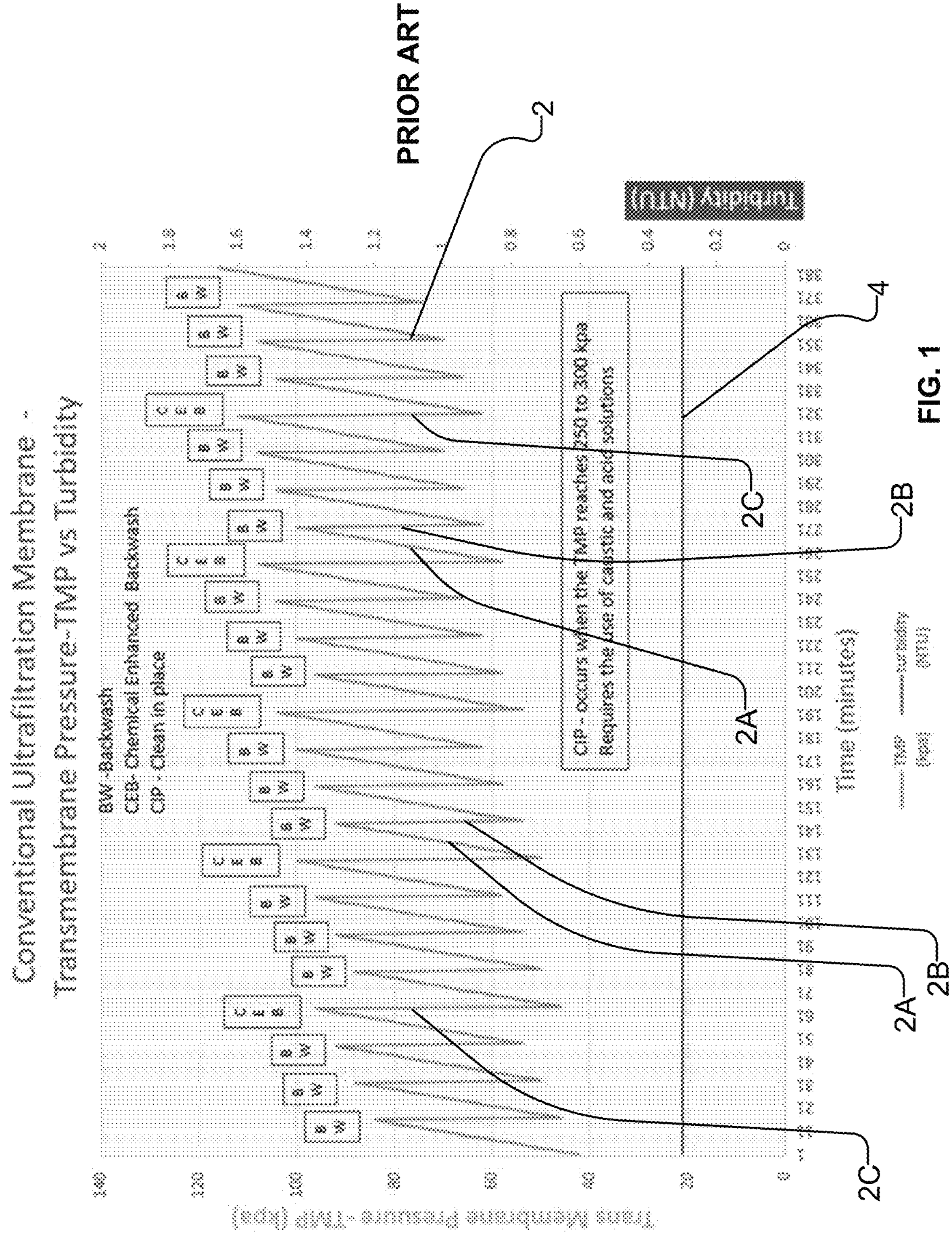
FIG. 1 is a plot of trans-membrane pressure and turbidity as a function of filtration time for a typical prior art direct membrane filtration operation using membranes often referred to as microfiltration or ultrafiltration membranes.
Figure 2:
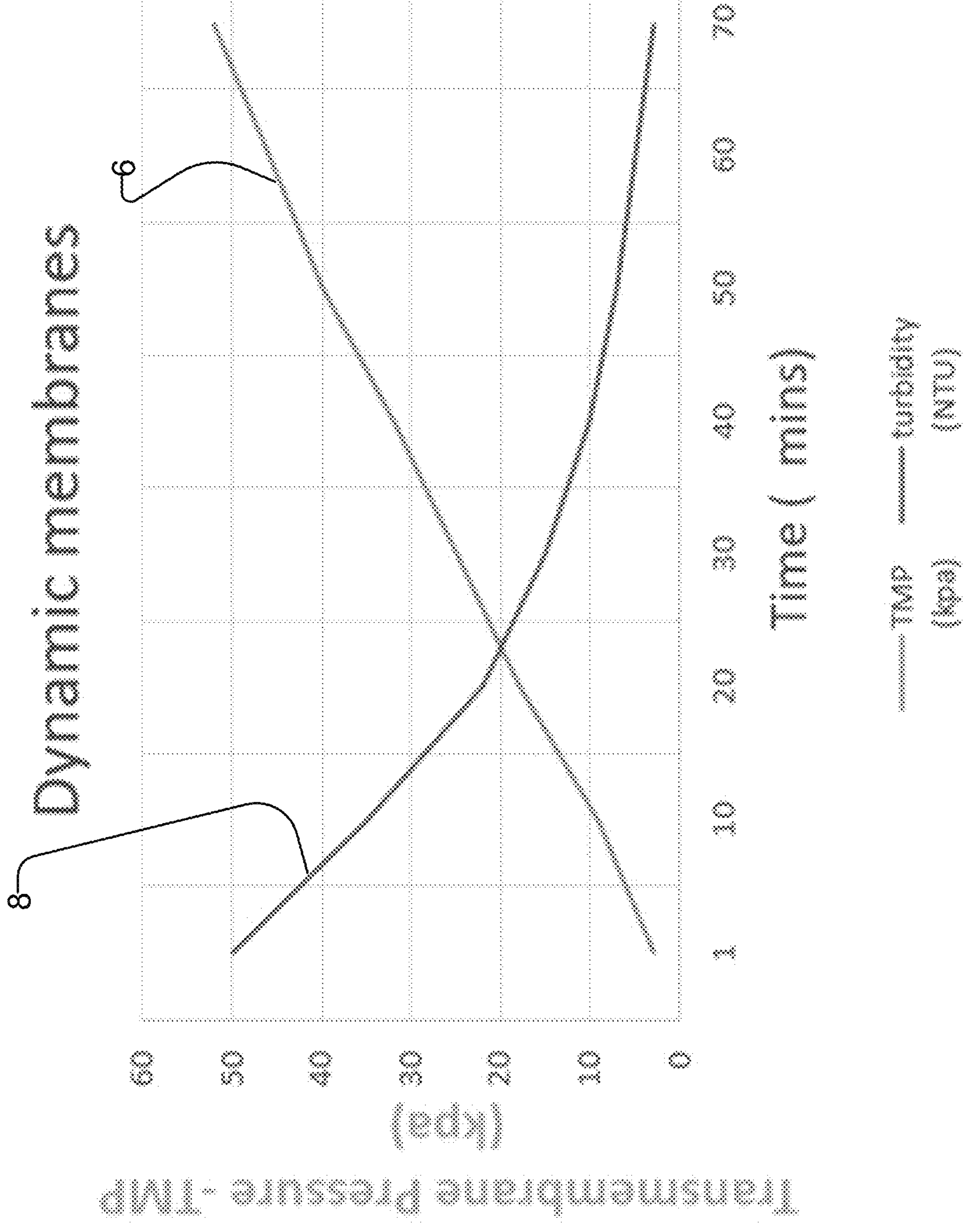
FIG. 2 is a plot of trans-membrane pressure and turbidity as a function of filtration time for a typical prior art dynamic filter operation.
Figure 3:
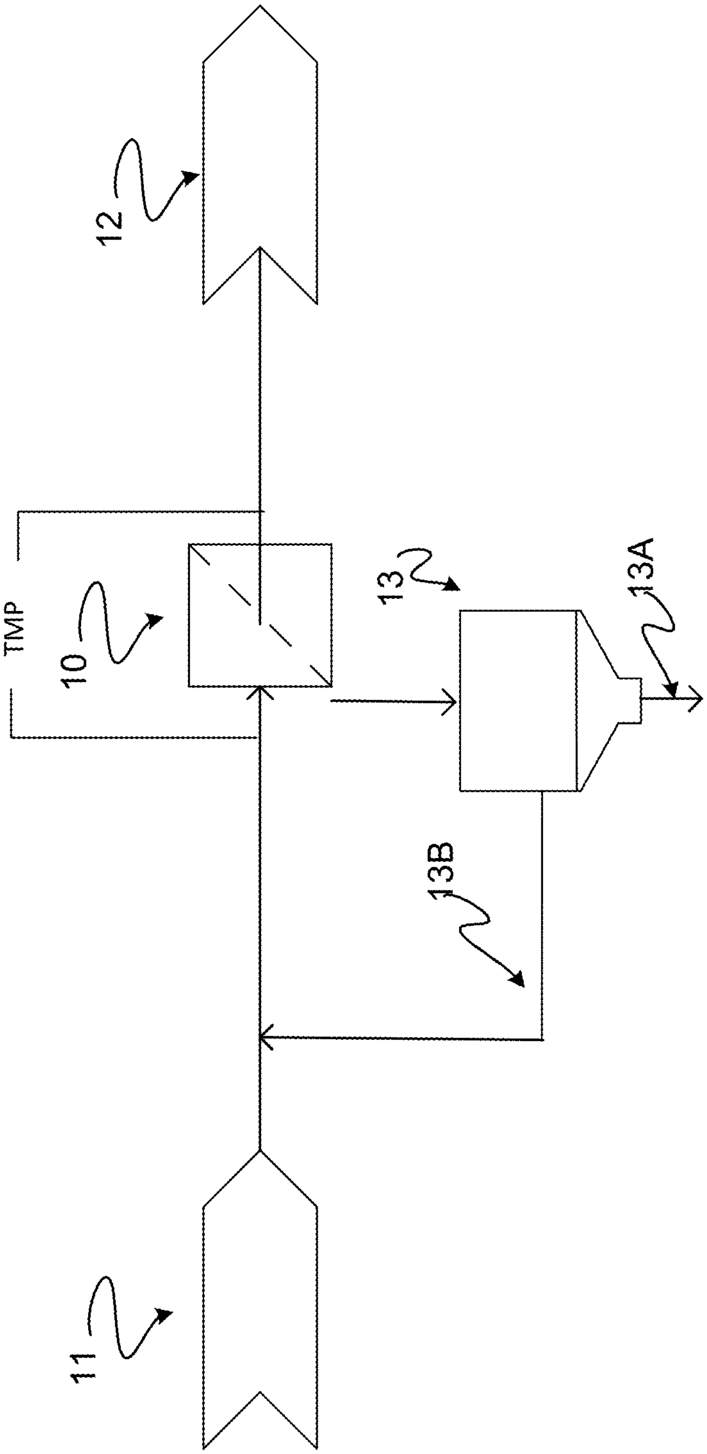
FIG. 3 is a process flow diagram of an example embodiment of this invention.

FIG. 3 depicts a simplified process flow diagram of an example embodiment of this invention. There is at least one inlet stream 11, and at least one outlet stream 12. There is also a membrane filter 10. Inlet stream 11 may be any suitable liquid in need of filtration. In particular, non-limiting example embodiments, the liquid in inlet stream 11 may comprise: water to be treated from a river or lake, waste hydraulic fracturing water, industrial process water containing metals, mine tailings water from mining bitumen extraction operations and/or the like. Outlet stream 12 contains the treated water (permeate), and may lead to further treatment operations. A system pressure differential may be created between inlet stream 11 and outlet stream 12, such that the liquid to be treated flows from inlet stream to outlet stream. This system pressure differential may be created by any suitable technique, including, for example, using pumps, valves, pistons, gravity and/or the like. FIG. 3 also shows the trans-membrane pressure (TMP) across membrane filter 10. Without wishing to be bound by theory, the TMP across membrane filter 10 may comprise some combination of hydraulic pressure and/or osmotic pressure (e.g. pressure that tends cause fluid movement between different regions based on differential concentrations of solutes and/or ions in the different regions) and these two pressure sources may counteract or compliment one another. Unit 13 is a settling tank, stream 13A is the reject stream, and stream 13B is the supernatant volume from settling tank 13.

Figure 4:
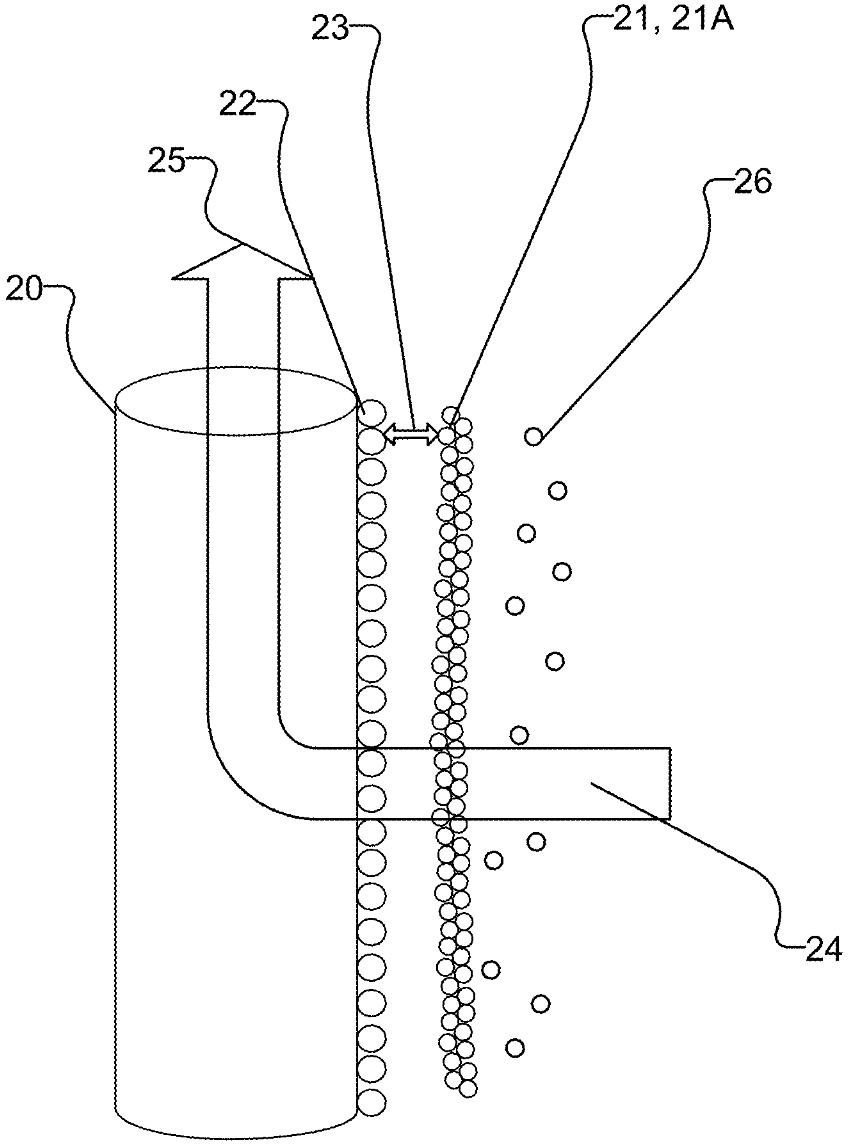
FIG. 4 is a schematic of a membrane tube according to an example embodiment of this invention.

FIG. 4 depicts a schematic of membrane tube 20 according to an embodiment of this invention. Membrane tube 20 may comprise a permeable membrane and may be fabricated from plastic, metal, ceramic and/or the like. Within membrane filter 10 (shown in FIG. 3), there may be a plurality of membrane tubes 20. Though the depicted embodiment of FIG. 4 and other portions of this disclosure describe membranes in the shape of tubes where water being treated is drawn from one side of the tube to the other side of the tube, the membrane(s) within membrane filter 10 may generally comprise any shape that permits water to be drawn from one side of the membrane to the other side of the membrane. By way on non-limiting example, in some embodiments, membranes are provided with a sheet like shape.

In the depicted embodiment of FIG. 4, deposited on the surface of membrane tube 20 comprises a formulated oxide powder 22. Formulated oxide powder 22 may comprise a powder modified, such as with activated carbon and/or other carbon components, metal oxide(s), zwitterionic polymer(s) RSL™ Powder sold by David Bromley Engineering Ltd. and/or the like. Preferably, formulated oxide powder 22 has a crystal structure that is stable at high temperatures and does not dissolve in the liquid being treated.

As shown in FIG. 4, a liquid 24 is drawn through formulated oxide powder 22 and membrane tube 20, forming treated liquid 25. Liquid 24 on an input side of membrane tube 20 contains suspended colloids 26 of solids, oil and/or other similar materials (which may be collectively referred to herein as colloids). Upon liquid 24 being drawn through membrane tube 20, suspended colloids 26 in liquid 24 are separated from liquid 24, to provide treated liquid 25 on an opposed side of membraned tube 20. In some embodiments, the flow through membrane tube 20 could be reversed—i.e. such that liquid is treated as it flows from an interior of membrane tube 20 to an exterior of membrane tube 20.

FIG. 4 depicts a colloid-free gap 23 between the formulated oxide powder 22 and the accumulated colloids 21. Colloid-free gap 23 may comprise a region within a vicinity of membrane 20 (and formulated oxide powder 22) having a low density of colloids relative to a colloid accumulation region 21A. Colloid-free gap 23 may be located in a volume between colloid accumulation region 21A and membrane 20 (or between colloid accumulation regions 21A and formulated oxide powder 22). Colloid-free gap 23 may be created as a result of the electric double layer (EDL) that forms on the surface of the formulated oxide powder 22 and the accumulated colloids 21 (an EDL may also form on suspended colloids 26). The EDL is a matrix of ionic charges that forms on and around the surface of objects exposed to fluids (including but not limited to formulated oxide powder

22, suspended colloids 26, and accumulated colloids 21). EDL's can form on a solid particle, a gas bubble, a liquid droplet, an oil droplet and/or a porous body. The EDL refers to two parallel layers of charge surrounding the object.

Figure 5:
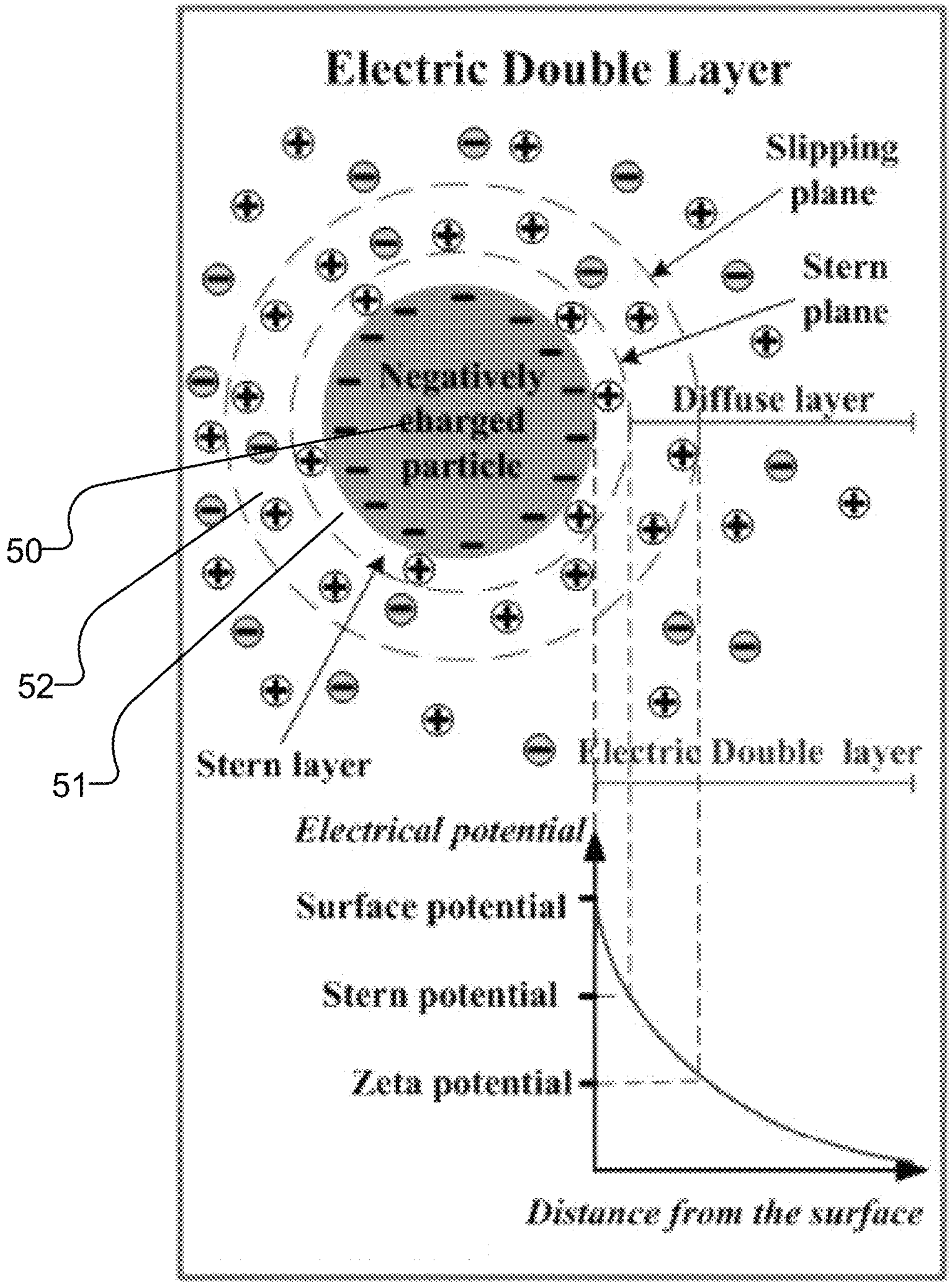
FIG. 5 is a schematic illustrative diagram detailing the composition of an electric double layer on a particle submerged in a fluid.

FIG. 5 is a schematic illustrative diagram of an EDL that has formed on a particle. FIG. 5 depicts first layer 51 (also called the Stern layer 51) of the EDL. Stern layer 51 may comprise a surface charge (either positive or negative) associated with ions adsorbed onto object 50 due to chemical and/or electrostatic interactions. Second layer 52 may comprise ions attracted to the surface charge in first layer 51 or the charge in object 50 via thermal motion and/or a Coulomb (electrostatic) force as explained by the so-called Gouy-Chapman Model. Second layer 52 is loosely associated with object 50 and may comprise free ions that move in the fluid under the influence of electric attraction and/or thermal motion, rather than being firmly anchored. Second layer 52 can thus also be called the "diffuse layer". The EDL on the surface of suspended colloids 26 tends to keep suspended colloids 26 in suspension in liquid 24 through repulsive forces, and tends to prevent suspended colloids 26 from flocculating. The EDL prevents flocculation of the suspended colloids 26 because as the colloids 26 approach each other, the co-ions and the counterions in the overlapping EDL's result in a high concentration of ions. The surrounding water has a lower concentration of ions and, as a result, there is an osmotic pressure from water entering the overlapping EDL's to dilute the concentration of ions. This creates an osmotic pressure which tends to force the colloids 26 to stay separated and suspended. Referring back to FIG. 4, this mechanism is also thought to cause a colloid-free gap 23 to form between formulated oxide powder 22 and colloids in liquid 24 through the interaction of the overlapping EDL's on formulated oxide powder 22 and the colloids in liquid 24. Because of liquid 24 being drawn through membrane tube 20, the colloids in liquid 24 tend to accumulate (as accumulated colloids 21) at the periphery of colloid-free gap 23.

Typically, when a liquid to be treated has a high amount of electrolytes (such as sodium, potassium, chloride, calcium, magnesium, phosphate and/or the like) that could be present in sea water) the EDLs on particles suspended in the liquid collapses. This is because the EDL's counter-ions and co-ions reject osmotic pressure to try and achieve ionic concentration equilibrium with the high ionic concentration in the surrounding water. As a result, the EDL collapses and the colloids can get close enough such that attractive Van der Waals forces take over and the colloids attract to each other, thus flocculating.

Flocculation does not occur in the example embodiments depicted and described in FIGS. 4 and 5 in the presence of high amounts of electrolytes. When exposed to a highly electrolytic fluid, formulated oxide powder 22 will have electrolyte ions concentrate in the first layer 51 (also called the Stern layer) and the second layer 52 (also called the diffuse layer). This results in a higher concentration of ions in the Stern and diffuse layer than in the liquid itself. As a result, no matter what the concentration of the electrolytes are in the liquid to be treated 24, the concentration of electrolyte ions in the first layer 51 and second layer 52 on the formulated oxide powder 22 is higher than the surrounding water. An osmotic pressure is created as water flows into the diffuse layer (second layer 52 in FIG. 5) on accumulated colloids 21 and formulated oxide powder 22. This causes a water interface between the diffuse layers 52 of accumulated colloids 21 and formulated oxide powder 22. This water interface layer is the colloid-free gap 23 and keeps the accumulated colloids 21 from contacting the formulated oxide powder 22, thus filtering the liquid 24 as the liquid is drawn through membrane tube 20 to provide treated liquid 25.

Figure 6:
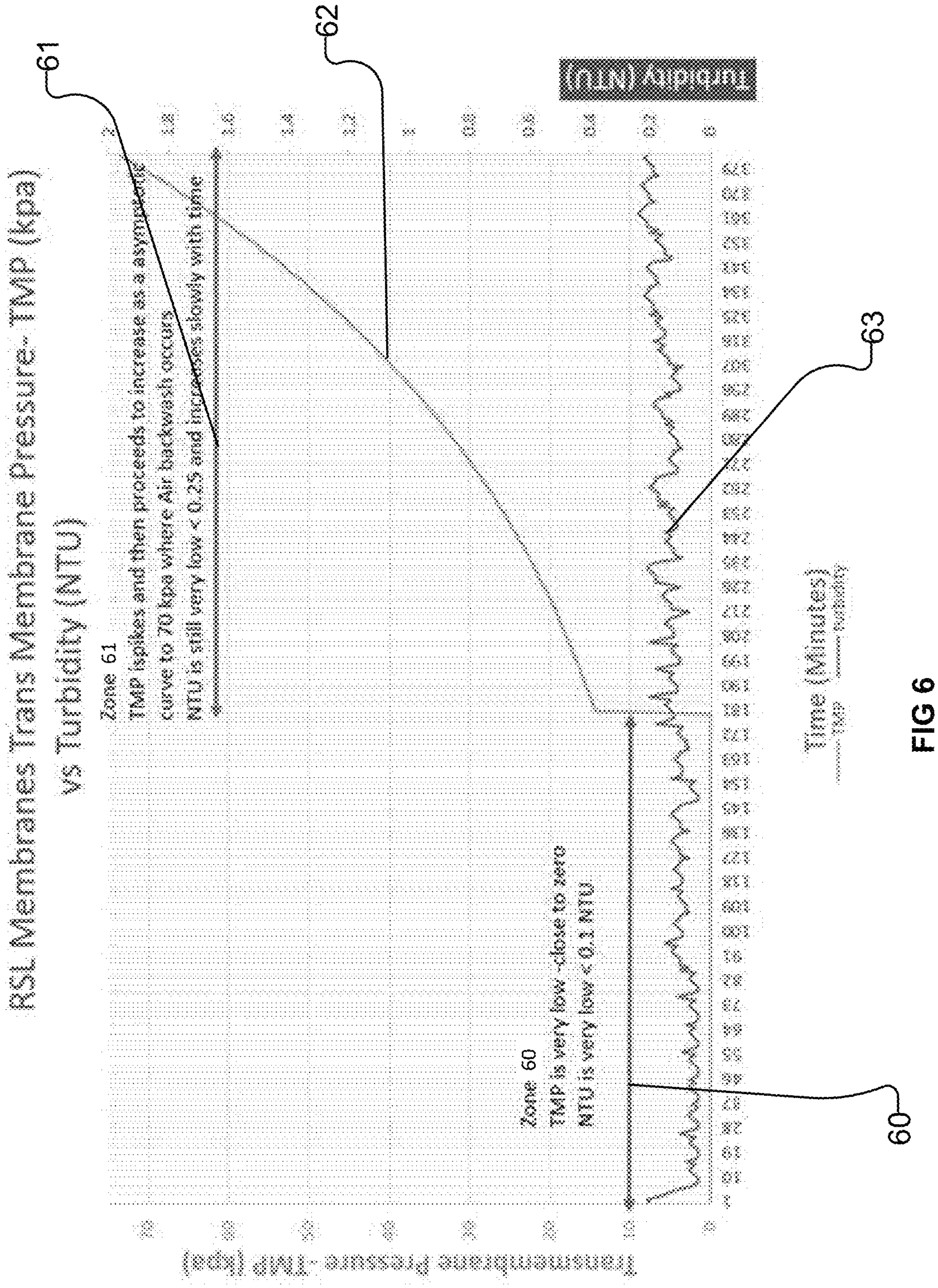
FIG. 6 is a plot of trans-membrane pressure and turbidity as a function of time for an example embodiment of this invention.

FIG. 6 is a plot of TMP 62 and turbidity 63 as a function of filtration time using the FIG. 3 filtration system incorporating the FIG. 4 membrane tube(s) 20 and formulated oxide powder 22. As depicted in FIG. 6, there is a low TMP across the membrane (e.g. membrane tube 20), as the membrane tube 20 remains un-fouled due to the colloid-free gap 23 between formulated oxide powder 22 and the accumulated colloids 21. Zone 60 (where the TMP 62 is near zero) corresponds to the TMP 62 while the colloid-free gap 23 is maintained. Zone 61 corresponds to the TMP 62 after the breakdown of the colloid-free gap 23. In Zone 61, the TMP 62 increases with time. This increase in the TMP 62 may be modelled as a linear, asymptotic or exponential increase. This zone 61 may be analogous to the build-up if TMP in the dynamic filter prior art described above. Between zones 60 and 61, there is a distinct jump in TMP, when the colloid-free gap 23 actually breaks down. As depicted in FIG. 6, the turbidity 63 of the treated liquid remains relatively constant (at a level of around 0.15 (but below 0.2 in the illustrated plot) Nephelometric Turbidity Units (NTU)) throughout the duration of the filtration cycle (i.e. both zones 60 and 61). In some embodiments, the turbidity of treated liquid using the FIG. 3 filtration system incorporating the FIG. 4 membrane tube(s) 20 and formulated oxide powder 22 is less than 1.0 NTU throughout the duration of the filtration cycle (i.e. in both zones 60 and 61).

Figure 7:
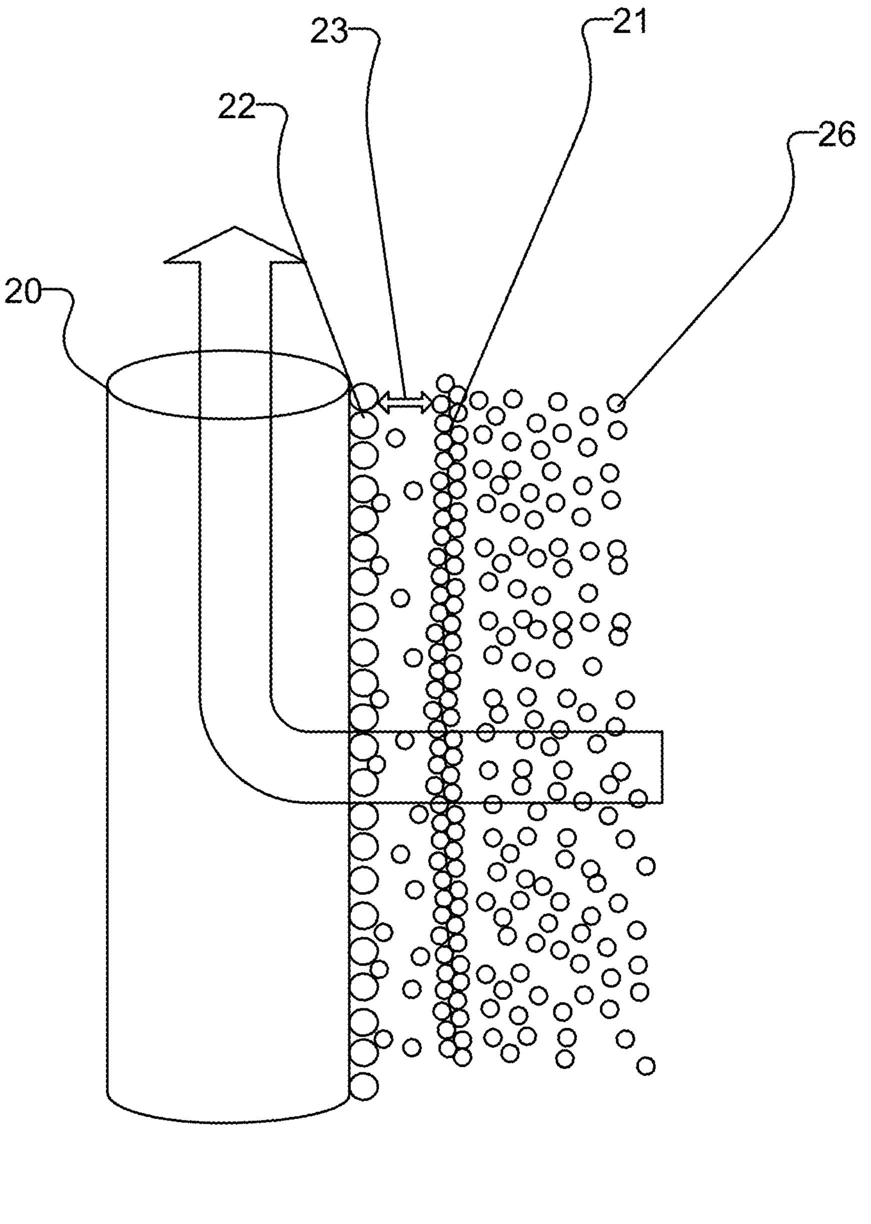
FIG. 7 is a schematic of a membrane tube whose colloid-free gap has broken down according to an example embodiment of this invention.

FIG. 7 depicts a membrane tube 20 coated with formulated oxide powder 22 wherein colloid-free gap 23 has begun to breakdown. Colloid-free gap 23 may breakdown for a number of reasons. One possible cause for the breakdown of colloid-free gap 23 could be elevated flow rates of liquid through the membrane tube 20. The increased momentum of suspended colloids 26 may be high enough to overcome the repulsive forces resulting from the interaction of the EDLs on the formulated oxide powder 22 and the suspended colloids 26. Another possible cause of the breakdown of colloid-free gap 23 is due to sustained loading. Without wishing to be bound by theory, the inventor posits that the width of colloid-free gap 23 may decrease due to: (1) the osmotic pressure from the EDL interaction between the accumulated colloids 21 and the formulated oxide powder 22 and/or (2) the osmotic pressure from the EDL interaction between suspended colloids 26. For example, the high concentration of accumulated colloids 21 may cause the net osmotic pressure to reduce as such colloids 21 approach the EDL of formulated oxide powder 22. Initially there may be an osmotic pressure from pure water to dilute the high strength ions of the EDLs of formulated oxide powder 22. However as colloids 21 accumulate and the EDLs around accumulated colloids 21 are concentrated, the EDLs around accumulated colloids 21 may cause a counter osmotic pressure, where water in colloid-free gap 23 has an osmotic pressure toward accumulated colloids 21, which tends to narrow colloid-free gap 23. The accumulated colloids 21 are thus able to come into close proximity with formulated oxide powder 22, such that the EDLs on the particles collapse. This enables the particles to come into close enough proximity such that attractive Van Der Waals forces dominate. The Van Der Waals forces result in attraction between the suspended colloids 26 and the formulated oxide powder 22. This attraction results in an accumulation of suspended colloids 26 on the surface of membrane tube 20, resulting in fouling of formulated oxide powder 22 on membrane tube 20 and a TMP across the filter increasing with filtration time (corresponding to zone 61 in FIG. 6).

Figure 8:
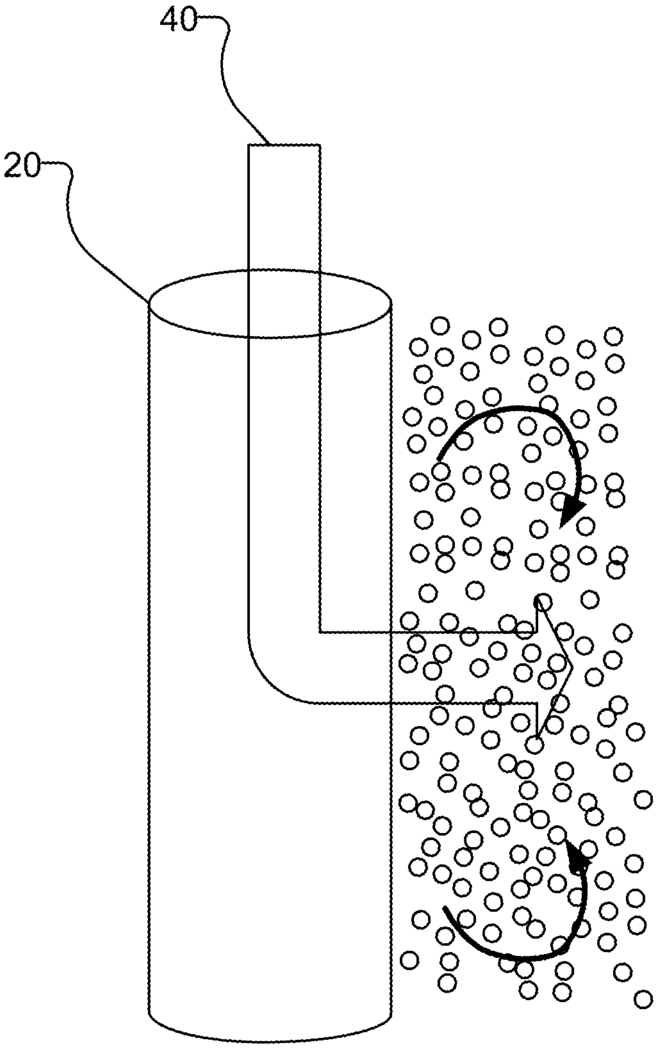
FIG. 8 is a schematic of a membrane tube being back-washed according to an example embodiment of this invention.

FIG. 8 depicts a membrane tube 20 during backwashing. Backwashing occurs when formulated oxide powder 22 on membrane tube 20 becomes fouled as a result of the breakdown of the colloid-free gap 23 (shown FIG. 7). Backwash stream 40 is introduced in a direction opposite to the flow of treated liquid 25. Backwash stream 40 may comprise any suitable fluid(s). In currently preferred embodiments, backwash stream 40 comprises air. Backwash stream 40 dislodges formulated oxide powder 22 and the fouling colloids from the surface of membrane tube 20. Backwash stream 40 can then settle in a settling tank 13 (shown in FIG. 3), with the supernatant fluid stream 13B (containing a low concentration of fouling colloids and formulated oxide powder 22) returning to the liquid to be treated and the reject stream 13A (containing a high concentration of fouling colloids and formulated oxide powder 22) being discarded. An advantage of backwashing with air is that air (a gas) decreases the amount of liquid in settling tank 13 (as compared to using a liquid (such as treated water) as a backwash fluid).

Figure 9:
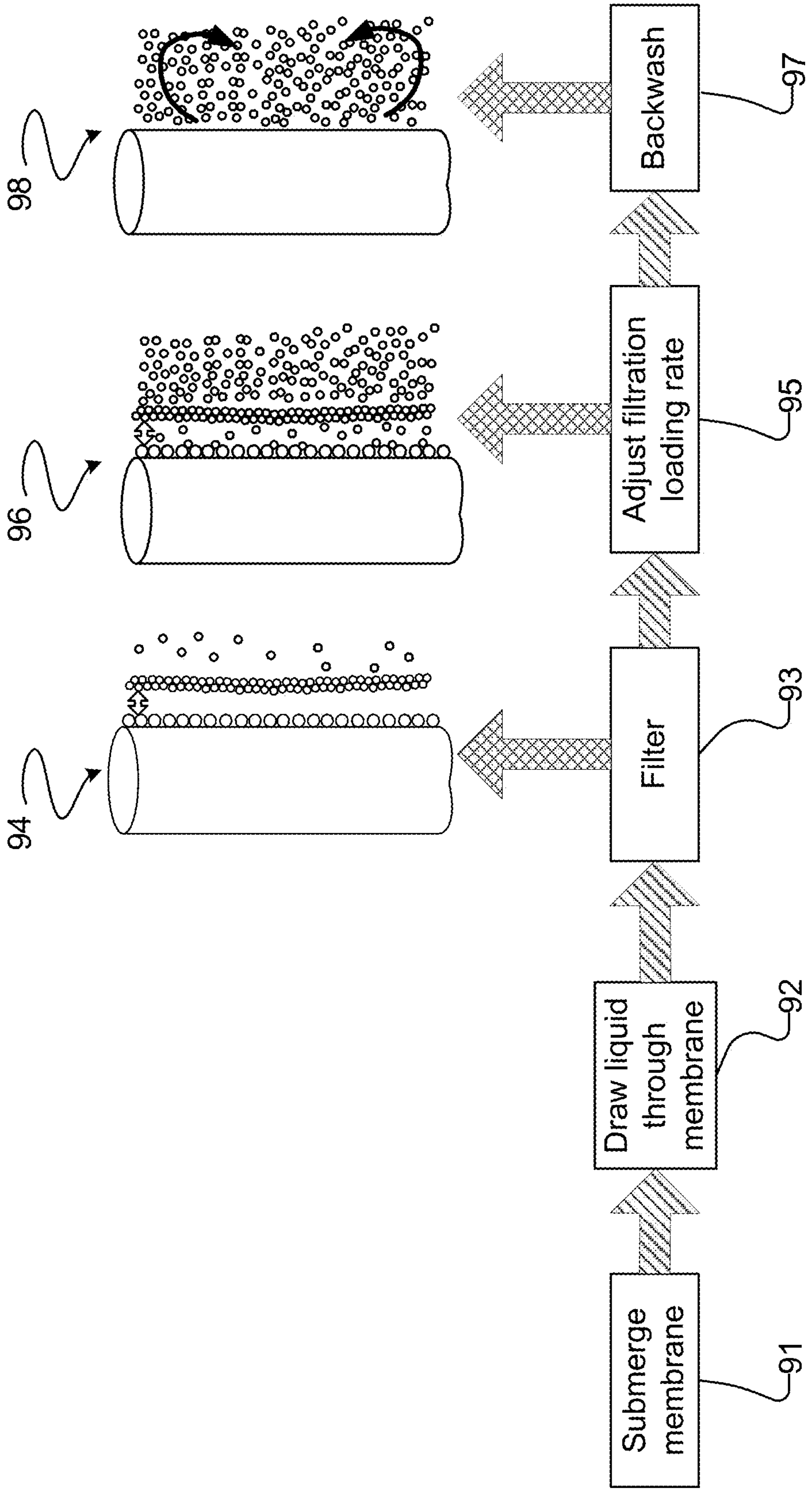
FIG. 9 is a flowchart of an example embodiment of this invention, wherein the filtration loading rate across the membrane filter is dynamically adjusted.

FIG. 9 depicts a flowchart illustrating a method of operating a membrane filtration system according to an embodiment of this invention, wherein the loading rate (also referred to as the filtration loading rate or flux rate) of a membrane filter 10 treated with formulated oxide powder 22 is dynamically adjusted to maintain a colloid-free gap 23. A typical flux rate ranges from 250 to 750 liters per $m^2$ per hour. In the filtration cycle, FIG. 9 depicts the management of the flux rate to maintain colloid-free gap 23. The membrane filter 10 is first submerged in a liquid to be treated, according to step 91. Prior to step 91, the membrane filter 10 is first treated with formulated oxide powder 22. To treat the membrane, formulated oxide powder 22 is first dispersed in a clean liquid and conveyed through inlet stream 11, and a pressure differential is maintained across the membrane filter 10 to draw formulated oxide powder 22 to the surface of the membrane (e.g. to the surfaces of membrane tubes 20). The clean liquid may come from a storage tank containing previously filtered liquid or from another clean source, and formulated oxide powder 22 may be dispersed within the storage tank prior to the clean liquid being drawn through the membrane, or may be injected directly into inlet stream 11. After the membrane (e.g. membrane tube(s) 20) is treated and reconfigured with formulated oxide powder 22 and submerged in the liquid to be treated per step 91, the liquid to be treated is drawn through inlet stream 11 to the membrane with a pressure differential according to step 92. The liquid to be treated is then filtered per step 93. Filtering entails the separation and removal of suspended colloids 26 from the liquid to be treated through the interaction described above between the EDLs on formulated oxide powder 22 and the suspended colloids 26, and as shown in graphic 94 in FIG. 9. Step 95 entails the dynamic adjustment of the filtration loading (flux) rate of the liquid to be treated through the filter to maintain a colloid-free gap 23 between the formulated oxide powder 22 and the suspended colloids 26. The filtration loading rate is defined as the volumetric flow rate of liquid to be treated per unit area of filter. The filtration loading rate may be kept constant to maintain the colloid-free gap 23, or it may be kept high at the initial stages of filtration and gradually lowered as the suspended colloids 26 accumulate in a layer of accumulated colloids 21 to maintain the colloid-free gap 23. After sustained loading of the membrane filter 10, the colloid-free gap 23 will breakdown as shown in graphic 96, and the TMP across the filter will increase dramatically. If filtration was continued after the breakdown of the colloid-free gap 23, a TMP across the filter increasing with filtration time would be observed (as shown in zone 61 of FIG. 6 and in a manner analogous to the increasing TMP in the "dynamic filter" prior art described above). After the breakdown of the colloid-free gap 23, the filter may be backwashed according to step 97 and graphic 98. The backwash fluid may be any fluid, but is preferably air, as shown in graphic 98. The backwash stream can settle in settling tank 13 (shown in FIG. 3), with the supernatant fluid stream 13B returning to the liquid to be treated and the reject stream 13A being discarded. After backwashing, the membrane filter 10 may be re-treated with formulated oxide powder 22, and filtration may resume (e.g. at step 91 again).

Figure 10:
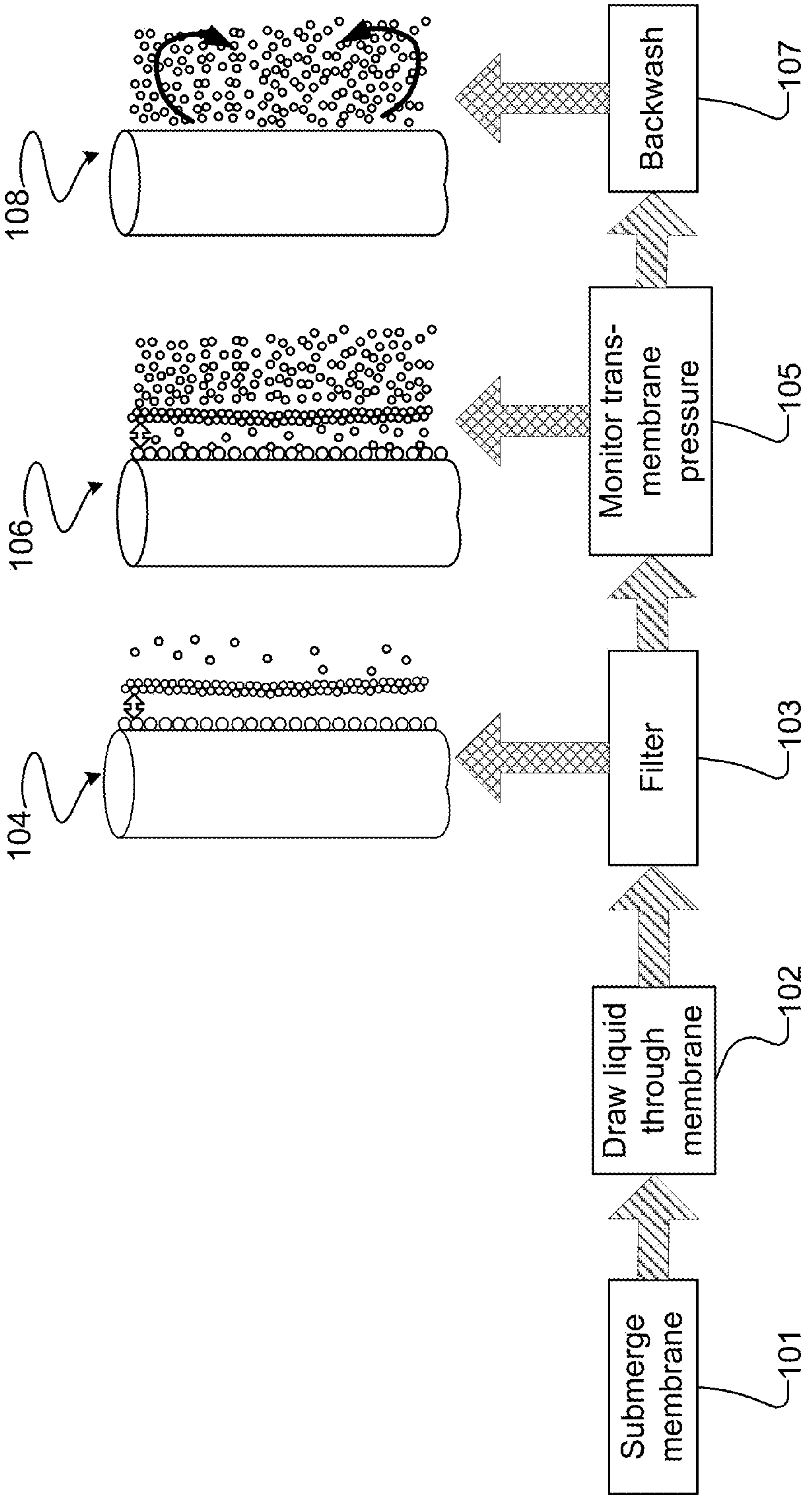
FIG. 10 is a flowchart of an example embodiment of this invention, wherein the TMP across the filter is monitored and maintained at a low level.

FIG. 10 depicts a flowchart illustrating another method of operating a membrane filter 10 according to an embodiment of this invention. Step 101 entails submerging the membrane filter 10 in a liquid to be treated. Prior to step 101, the membrane filter 10 is treated with formulated oxide powder 22 by drawing clean liquid containing formulated oxide powder 22 through the filter. Step 102 entails drawing the liquid to be treated through the membrane filter with a pressure differential. Step 103 entails separation and removal of the suspended colloids 26 in the liquid to be treated through the EDL interactions between the formulated oxide powder 22 and the suspended colloids 26, as shown in graphic 104. Step 105 entails actively monitoring the TMP across the membrane filter 10 (using one or more suitable sensors) to determine when the colloid-free gap 23 has broken down (as shown in graphic 106), and when backwashing is desired. With the colloid-free gap 23 maintained, the TMP across the filter will be low and constant. When the colloid-free gap 23 breaks down, the TMP across the filter will increase rapidly compared to when colloid-free gap 23 is in place as shown in zone 60 of FIG. 6. This rapid increase in TMP when colloid-free gap 23 breaks down can be observed by suitable pressure sensing. For example, when colloid-free gap 23 breaks down, the TMP may increase from a TMP less than some configurable threshold to a TMP that is greater than some configurable threshold. In some embodiments, this threshold may be 7 kPA; in some embodiments this threshold may be 12 kPA; in some embodiments, this threshold may be 20 kPA; in some embodiments, this threshold may be 25 kPa. By way of non-limiting example, a TMP threshold of in a range of approximately 10-14 kPa may be suitable for indicating that that the colloid-free gap 23 has broken down in some embodiments. In some embodiments, the detection of the breakdown of colloid-free gap 23 also depends on the rate of increase of TMP. For example, detecting the breakdown of colloid-free gap 23 may involve determining that an increase in TMP (e.g. from below a threshold to above a threshold and/or an increase by a threshold amount (e.g. a threshold TMP difference)) has occurred within a threshold period of time. For example if the slope of measured TMP versus time is greater than a threshold amount, then it may be concluded that colloid-free gap 23 has broken down or is at least beginning to break down. If filtering is permitted to continue after the colloid-free gap 23 breaks down, with continued loading of the filter, the TMP will increase across the filter due to the accumulation of a 'filter cake' on the surface of the membrane and suspended colloids destabilizing and attaching to formulated oxide powder 22.

In some embodiments, a suitably configured (e.g. programmed) controller may be configured to commence the backwashing process immediately after detection of the breakdown of colloid-free gap 23 by the TMP crossing a suitable threshold (or after some suitable delay to prevent false positives). After the breakdown of the colloid-free gap 23, step 107 entails backwashing the filter with a fluid, preferably air as shown in graphic 108. The backwash stream can settle in settling tank 13 (shown in FIG. 3), with the supernatant fluid stream 13B returning to the liquid to be treated and the reject stream 13A being discarded. After backwashing according to step 107, the membrane filter 10 may be re-treated and reconfigured with formulated oxide powder 22, and filtration may resume.

In some embodiments, after detection of the breakdown of colloid-free gap 23, a suitably configured (e.g. programmed) controller may be configured to reduce the filtration loading rate—e.g. by reducing the system pressure differential or otherwise. This reduction in filtration loading rate may in turn reduce the TMP again. In some embodiments, backwashing can be commenced upon detecting of the TMP increasing again above a further threshold. In some embodiments, this further threshold may be less than the original threshold (i.e. the threshold upon which the breakdown of the colloid-free gap was detected). In some embodiments, this further threshold may be greater than the original threshold.

Figure 11:
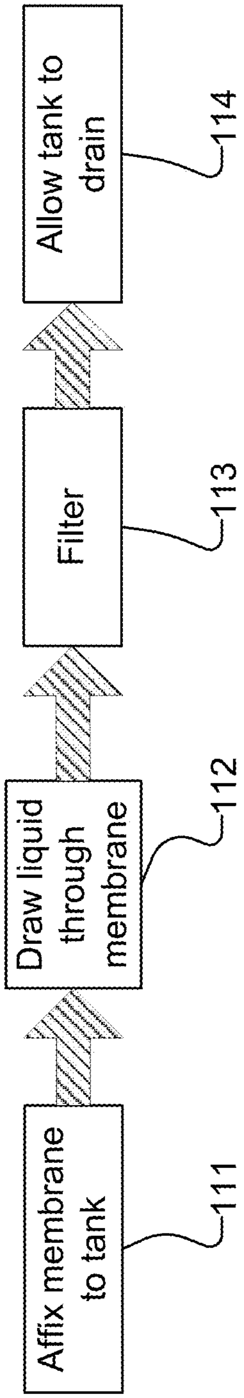
FIG. 11 is a flowchart of an embodiment of this invention, wherein the membrane filter is affixed to a tank containing a liquid to be treated.

FIG. 11 depicts a flowchart illustrating another method of operating a membrane filter 10 according to an embodiment of this invention. Step 111 entails affixing a membrane filter 10 to (or otherwise supporting membrane filter 10 in) a tank filled with a liquid to be treated. The membrane filter 10 is treated with formulated oxide powder 22 by drawing a clean liquid containing formulated oxide powder 22 through the filter prior to step 111. The clean liquid could be stored in a separate tank in fluid communication with the membrane filter 10, and the formulated oxide powder 22 could be dispersed in the separate tank. The clean liquid could then be drawn through the membrane filter 10 through the static head from the separate tank, thereby depositing formulated oxide powder 22 on the membrane filter 10. The membrane filter 10 could also be treated by adding the formulated oxide powder 22 directly to inlet stream 11 of membrane filter 10. After the membrane filter 10 is fluidly attached to the tank filled with a liquid to be treated, step 112 entails drawing the liquid to be treated through the filter. Step 112 may preferably draw the liquid through the filter via the static head of the tank alone—i.e. without pumping or otherwise supplying energy (other than gravity) to cause a flow of the liquid being treated through membrane filter 10. The static head is defined as the pressure imposed by a column of liquid due to the influence of gravity. Advantageously, step 112 may be performed using only the static head because of the low TMP used in the methods described herein. Step 113 entails filtering the suspended colloids 26 in the liquid to be treated by maintaining a colloid-free gap 23 between the formulated oxide powder 22 and the layer of accumulated colloids 21. Step 114 entails allowing the tank to drain through the membrane filter 10. In the method shown in FIG. 11, because the filter is affixed to a tank filled with a liquid to be treated, and because the liquid in the tank will drain through the filter, the loading rate of liquid across the filter will decrease as the height of the liquid to be treated in the tank decreases. This is advantageous as the size of the layer of accumulated colloids 21 will increase with increased filtration time, and the lower loading rates across the filter as the tank drains will ensure that the colloid-free gap 23 is maintained with the increased size of the layer of accumulated colloids 21. This embodiment is further advantageous as, provided the colloid-free gap 23 is maintained, there will be a low TMP across the membrane filter 10, ensuring that the static head of the water in the tank alone will be sufficient to draw the liquid to be treated through the filter.

Interpretation of Terms

Unless the context clearly requires otherwise, throughout the description and the

- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while steps or blocks are presented in a given order, alternative examples may perform routines having steps, or employ systems having blocks, in a different order, and some steps or blocks may be deleted, moved, added, subdivided, combined, and/or modified to provide alternative or subcombinations. Each of these steps or blocks may be implemented in a variety of different ways. Also, while steps or blocks are at times shown as being performed in series, these steps or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

Non-Limiting Aspects of the Invention

The invention has a number of non-limiting aspects. Non-limiting aspects of the invention comprise:

1. A method for treating liquid, the method comprising:
   submerging a membrane treated with formulated oxide powder in a liquid to be treated;
   maintaining a system pressure differential between locations across the membrane to draw the liquid to be treated through the membrane;
   filtering the liquid to be treated by maintaining a colloid-free gap between the formulated oxide powder on the membrane and colloids in the liquid to be treated; and
   adjusting the filtration loading rate of the liquid to be treated to maintain the colloid-free gap.
2. The method of aspect 1 comprising treating the surface of the membrane by depositing the formulated oxide powder into a treated liquid and drawing the treated liquid through the membrane with the system pressure differential between locations across the membrane thereby depositing the formulated oxide powder on the surface of the membrane.
3. The method of any one of aspects 1 to 2 wherein the filtration loading rate is reduced over a filtration time to maintain the colloid-free gap.
4. The method of any one of aspects 1 to 3 wherein maintaining a colloid-free gap comprises causing a trans-membrane pressure (TMP) of less than 25 KPa.
5. The method of any one of aspects 1 to 4 comprising detecting a breakdown of the colloid-free gap after a period of sustained filtering.
6. The method of aspect 5 wherein detecting the breakdown of the colloid-free gap comprises detecting a change in trans-membrane pressure (TMP) from below a threshold to above the threshold.
7. The method of aspect 6 wherein detecting the change in trans-membrane pressure (TMP) from below the threshold to above the threshold comprises detecting the change in TMP within a threshold amount of time.
8. The method of any one of aspects 5 to 7 comprising backwashing the membrane after detecting the breakdown of the colloid-free gap.
9. The method of aspect 8 comprising backwashing the membrane using air as the backwash fluid.
10. The method of any one of aspects 8 to 9 wherein backwashing the membrane comprises: allowing a backwash volume to settle in a settling tank, returning a supernatant volume to the liquid to be treated, and a rejecting a settled volume.
11. A method of filtering liquid, the method comprising:
   submerging a membrane treated with formulated oxide powder in a liquid to be treated;
   drawing the liquid to be treated through the membrane;
   filtering the liquid to be treated by maintaining a colloid-free gap between the formulated oxide powder on the membrane and colloids in the liquid to be treated; and
   maintaining, for a period of sustained filtering prior to breakdown of the colloid-free gap, a low, near-zero, trans-membrane pressure (TMP) across the membrane.
12. The method of aspect 11 comprising treating the surface of the membrane by depositing the formulated oxide powder into a treated liquid and drawing the treated liquid through the membrane with a system pressure differential between locations across the membrane thereby depositing the formulated oxide powder on the surface of the membrane.
13. The method of any one of aspects 11 to 12 comprising reducing a filtration loading rate over a filtration time to maintain the colloid-free gap.
14. The method of any one of aspects 11 to 12 comprising maintaining a constant filtration loading rate.
15. The method of any one of aspects 1 to 4 comprising detecting a breakdown of the colloid-free gap after a period of sustained filtering.
16. The method of aspect 15 wherein detecting the breakdown of the colloid-free gap comprises detecting a change in trans-membrane pressure (TMP) from below a threshold to above the threshold.
17. The method of aspect 16 wherein detecting the change in trans-membrane pressure (TMP) from below the threshold to above the threshold comprises detecting the change in TMP within a threshold amount of time.
18. The method of any one of aspects 15 to 17 comprising backwashing the membrane after detecting the breakdown of the colloid-free gap.
19. The method of aspect 18 comprising backwashing the membrane using air as the backwash fluid.
20. The method of any one of aspects 18 to 19 wherein backwashing the membrane comprises: allowing a backwash volume to settle in a settling tank, returning a supernatant volume to the liquid to be treated, and a rejecting a settled volume.
21. The method of any one of aspects 15 to 17 comprising reducing a filtration loading rate after detecting the breakdown of the colloid-free gap.
22. The method of any one of aspects 15 to 17 comprising, after reducing the filtration loading rate, determining that the TMP has increased to above a further threshold level and backwashing the membrane after determining that the TMP has increased to above a further threshold level.
23. The method of aspect 22 comprising backwashing the membrane using air as the backwash fluid.
24. The method of any one of aspects 22 to 23 wherein backwashing the membrane comprises: allowing a backwash volume to settle in a settling tank, returning a supernatant volume to the liquid to be treated, and a rejecting a settled volume.
25. A method for treating liquid in a tank, the method comprising:
   fluidly attaching a membrane treated with formulated oxide powder to a tank containing a liquid to be treated;
   drawing the liquid to be treated through the membrane with a system pressure differential across the membrane, the system pressure differential imposed by the fluid height in the tank; and
   filtering the liquid in the tank by maintaining a colloid-free gap between the formulated oxide powder on the membrane and the colloids in the liquid to be treated; and
   maintaining, for a period of sustained filtering prior to breakdown of the colloid-free gap, a low, near-zero, trans-membrane pressure (TMP) across the membrane.

26. The method of aspect 25 further comprising treating the surface of the membrane by depositing the formulated oxide powder into a treated liquid stored in a separate tank and drawing the treated liquid through the membrane with a system pressure differential imposed by the fluid height of the separate tank and thereby depositing the formulated oxide powder on the surface of the membrane.
27. The method of any one of aspects 25 or 26 wherein the only source of pressure differential across the membrane is the fluid height of the tank.
28. The method of any one of aspects 25 to 27 comprising maintaining the colloid-free gap throughout the time it takes for the liquid to be treated in the tank to drain through the membrane.
29. The method of any one of aspects 1 to 10 comprising, while filtering the liquid to be treated and adjusting the filtration loading rate, maintaining a low permeate turbidity that is independent of trans-membrane pressure.
30. The method of any one of aspects 11 to 24 comprising, while filtering the liquid to be treated and maintaining, for a period of sustained filtering prior to breakdown of the colloid-free gap, the low trans-membrane pressure (TMP) across the membrane, maintaining a low permeate turbidity that is independent of the TMP.
31. The method of any one of aspects 25 to 28 comprising, while filtering the liquid in the tank, maintaining a low permeate turbidity that is independent of trans-membrane pressure.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A method for treating liquid, the method comprising:
submerging a membrane treated with formulated oxide powder in a liquid to be treated;
maintaining a system pressure differential between locations across the membrane to draw the liquid to be treated through the membrane;
filtering the liquid to be treated by maintaining a colloid-free gap between the formulated oxide powder on the membrane and colloids in the liquid to be treated; and
adjusting the filtration loading rate of the liquid to be treated to maintain the colloid-free gap.

2. The method of claim 1 comprising treating the surface of the membrane by depositing the formulated oxide powder into a treated liquid and drawing the treated liquid through the membrane with the system pressure differential between locations across the membrane thereby depositing the formulated oxide powder on the surface of the membrane.

3. The method of claim 1 wherein the filtration loading rate is reduced over a filtration time to maintain the colloid-free gap.

4. The method of claim 1 wherein maintaining a colloid-free gap comprises causing a trans-membrane pressure (TMP) of less than 25 KPa.

5. The method of claim 1 comprising detecting a breakdown of the colloid-free gap after a period of sustained filtering.

6. The method of claim 5 wherein detecting the breakdown of the colloid-free gap comprises detecting a change in trans-membrane pressure (TMP) from below a threshold to above the threshold.

7. The method of claim 6 wherein detecting the change in trans-membrane pressure (TMP) from below the threshold to above the threshold comprises detecting the change in TMP within a threshold amount of time.

8. The method of claim 5 comprising backwashing the membrane after detecting the breakdown of the colloid-free gap.

9. The method of claim 8 comprising backwashing the membrane using air as the backwash fluid.

10. The method of claim 8 wherein backwashing the membrane comprises: allowing a backwash volume to settle in a settling tank, returning a supernatant volume to the liquid to be treated, and a rejecting a settled volume.

11. A method of filtering liquid, the method comprising:
submerging a membrane treated with formulated oxide powder in a liquid to be treated;
drawing the liquid to be treated through the membrane;
filtering the liquid to be treated by maintaining a colloid-free gap between the formulated oxide powder on the membrane and colloids in the liquid to be treated;
maintaining, for a period of sustained filtering prior to breakdown of the colloid-free gap, a low, near-zero, trans-membrane pressure (TMP) across the membrane; and
reducing a filtration loading rate over a filtration time to maintain the colloid-free gap.

12. The method of claim 11 comprising treating the surface of the membrane by depositing the formulated oxide powder into a treated liquid and drawing the treated liquid through the membrane with a system pressure differential between locations across the membrane thereby depositing the formulated oxide powder on the surface of the membrane.

13. The method of claim 11 comprising detecting a breakdown of the colloid-free gap after the period of sustained filtering.

14. The method of claim 13 wherein detecting the breakdown of the colloid-free gap comprises detecting a change in trans-membrane pressure (TMP) from below a threshold to above the threshold.

15. The method of filtering liquid, the method comprising:
submerging a membrane treated with formulated oxide powder in a liquid to be treated;
drawing the liquid to be treated through the membrane;
filtering the liquid to be treated by maintaining a colloid-free gap between the formulated oxide powder on the membrane and colloids in the liquid to be treated; and
maintaining, for a period of sustained filtering prior to breakdown of the colloid-free gap, a low, near-zero, trans-membrane pressure (TMP) across the membrane;
detecting a breakdown of the colloid-free gap after the period of sustained filtering;
wherein detecting the breakdown of the colloid-free gap comprises detecting a change in trans-membrane pressure (TMP) from below a threshold to above the threshold; and
wherein detecting the change in trans-membrane pressure (TMP) from below the threshold to above the threshold comprises detecting the change in TMP within a threshold amount of time.

16. The method of claim 13 comprising backwashing the membrane after detecting the breakdown of the colloid-free gap.

17. The method of filtering liquid, the method comprising:
submerging a membrane treated with formulated oxide powder in a liquid to be treated;
drawing the liquid to be treated through the membrane;
filtering the liquid to be treated by maintaining a colloid-free gap between the formulated oxide powder on the membrane and colloids in the liquid to be treated; and
maintaining, for a period of sustained filtering prior to breakdown of the colloid-free gap, a low, near-zero, trans-membrane pressure (TMP) across the membrane;
detecting a breakdown of the colloid-free gap after a period of sustained filtering; and
reducing a filtration loading rate after detecting the breakdown of the colloid-free gap.

18. The method of claim 16 comprising backwashing the membrane using air as the backwash fluid.

19. The method of claim 16 wherein backwashing the membrane comprises: allowing a backwash volume to settle in a settling tank, returning a supernatant volume to the liquid to be treated, and rejecting a settled volume.

20. The method of claim 15 further comprising reducing a filtration loading rate over a filtration time to maintain the colloid-free gap.

* * * * *